March 28, 1967   L. J. MILLER ETAL   3,311,343
ELASTIC FLUID APPARATUS
Filed Jan. 14, 1965   3 Sheets-Sheet 1

March 28, 1967 L. J. MILLER ETAL 3,311,343
ELASTIC FLUID APPARATUS
Filed Jan. 14, 1965 3 Sheets-Sheet 2
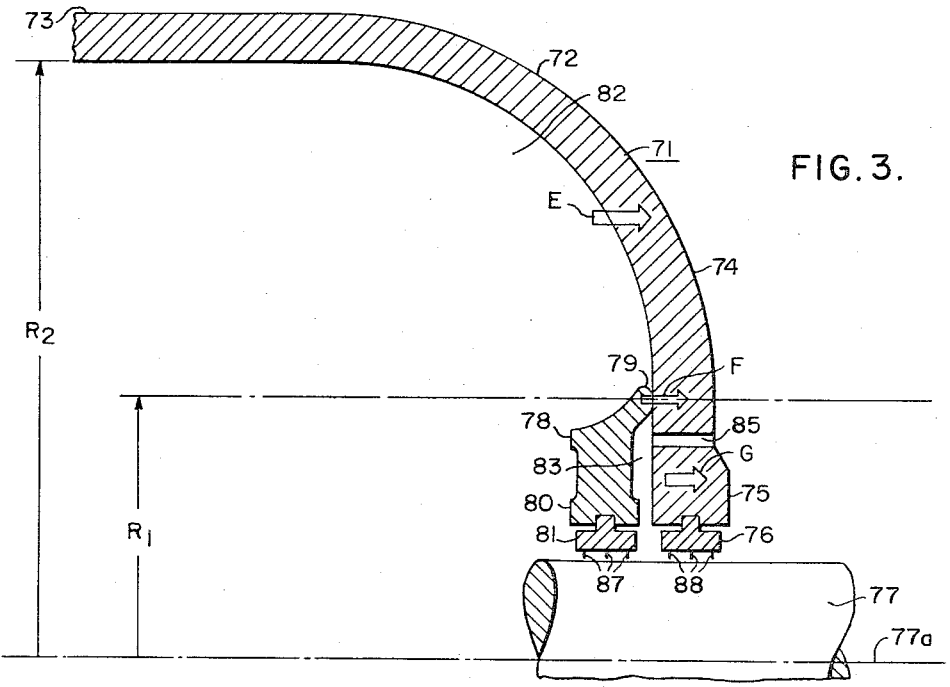
FIG. 3.
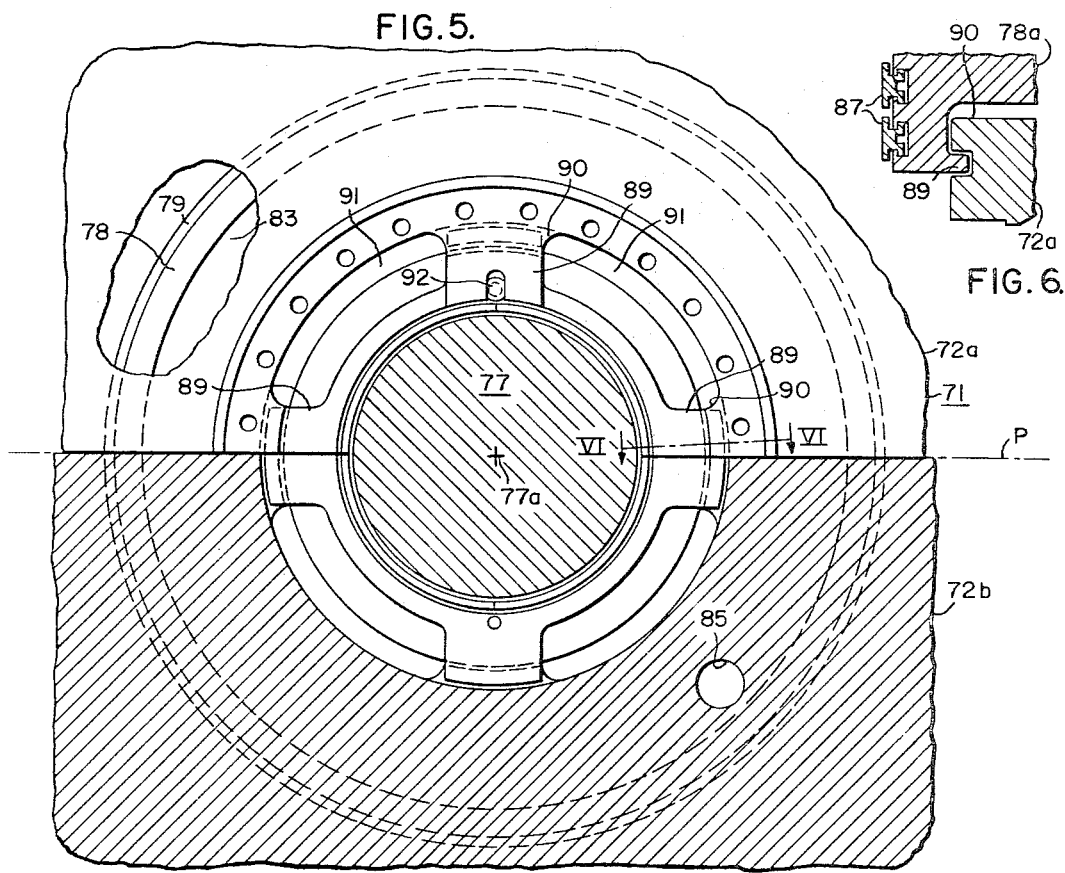
FIG. 5.
FIG. 6.

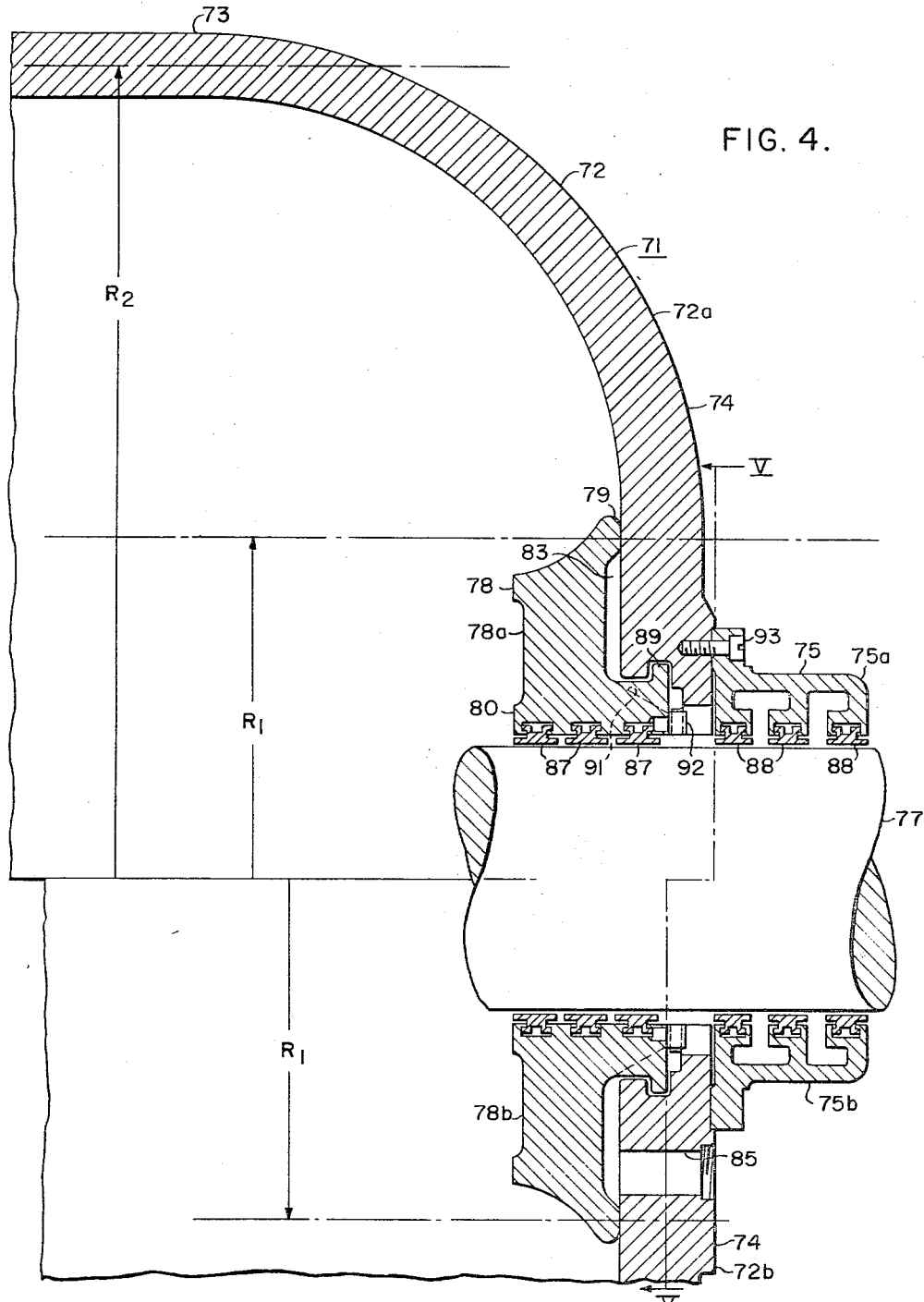

United States Patent Office
3,311,343
Patented Mar. 28, 1967

3,311,343
ELASTIC FLUID APPARATUS
Lewis J. Miller, Wallingford, and Donald N. Tapper, Media, Pa., assignors to Westinghouse Electric Corporation, Pittsburgh, Pa., a corporation of Pennsylvania
Filed Jan. 14, 1965, Ser. No. 425,586
6 Claims. (Cl. 253—39)

This invention relates to elastic fluid utilizing machines such as turbines and compressors, more particularly to casing structures for such machines, and has for an object to provide improved structure of this type.

Elastic fluid utilizing machines, for example steam turbines, have external casing structures through which the rotor shaft extends. To minimize leakage of the hot elastic fluid past the shaft and through the opening in the end wall of the casing to atmosphere, the end wall in at least one prior arrangement has been provided with two sets of sealing structures carried by the end wall and spaced from each other in axial direction (with respect to the shaft). The space or chamber defined by the two sealing structures and the end wall is preferably connected to a region of lower pressure than that existing within the casing, thereby to minimize the leakage to atmosphere by reducing the pressure level in the chamber.

The above prior arrangement, while generally satisfactory, requires considerable thickness in the end wall structure in the annular gland ring portion carrying the sealing structures and forming the chamber, first to withstand the high fluid pressure loads thereon, second to physically accommodate the seals and chamber, and third to permit the connection of an external bleed conduit.

In view of the above, it is an object of the invention to provide a casing of the above type in which the end wall thickness may be reduced without affecting its ability to carry the pressure loads imposed thereon by the elastic fluid in the casing.

A further object is to provide a casing structure of the above type wherein the reduced pressure chamber within the two seal structures may be enlarged as desired without requiring an increase in the end wall thickness to structurally permit such enlargement.

A more specific object is to provide a casing structure for an elastic fluid machine having an improved gland sealing arrangement.

Briefly, in accordance with the invention there is provided a casing for an elastic fluid utilizing machine having a tubular wall portion and an integral end wall portion defining a space subject to elastic fluid pressure and having a central opening through which the rotatable shaft of the machine extends.

An annular internal end wall member is disposed in the space in generally spaced relation with the end wall of the casing, but with its peripheral portion in sealing abutment with one of the casing wall portions, and also having a central opening through which the shaft extends. The internal end wall member, together with the end wall of the casing, at least partly defines a chamber and seal structures are carried by the internal and external end walls to restrict flow of pressurized fluid from the space to the chamber and from the chamber to atmosphere. To maintain the chamber at a lower fluid pressure level than the space, the leakage fluid thereinto is bled to a region of suitable lower pressure.

With this arrangement, the spacing between the seal structures may be modified as required for suitable connection to a bleed conduit, without the necessity of thickening the casing end wall, since only one seal structure is carried by each end wall. Further, the pressure loading on the end wall of the casing may be readily alleviated, as dictated by economic aspects, by varying the diametric dimension of the internal end wall.

The above and the objects, are effected by the invention as will be apparent from the following description and claims taken in connection with the accompanying drawings, forming a part of this application, in which:

FIG. 3 is a view similar to FIG. 2, but illustrating a second and preferred embodiment of the invention;

FIG. 4 is a view similar to FIG. 3 but illustrating in more detail the preferred embodiment;

FIG. 5 is a transverse sectional view taken along line V—V of FIG. 4; and

FIG. 6 is a fragmentary sectional view taken on line VI—VI of FIG. 5.

Figure 1:
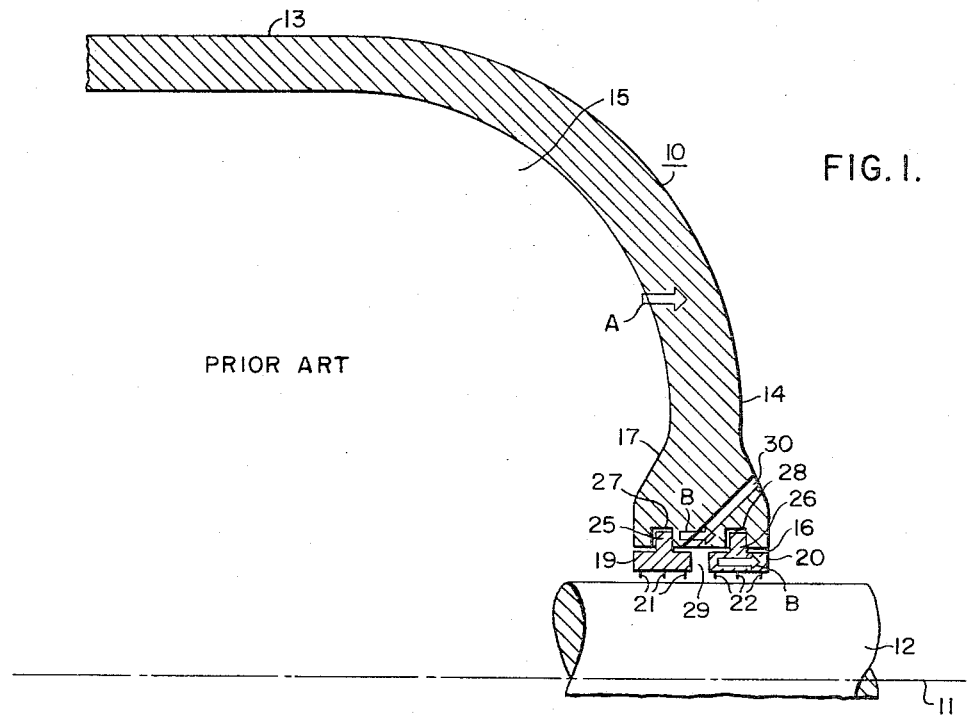
FIGURE 1 is a diagrammatic fragmentary radial sectional view of a prior turbine casing structure.

Referring to the drawings in detail, in FIG. 1 there is shown, in fragmentary radial section, a portion of a steam turbine casing structure 10 having a central longitudinal axis 11 and a rotor shaft 12 extending therethrough and conventionally formed and arranged to carry rotatable blades (not shown) in accordance with the prior art. As well known, the casing 10 has a tubular wall portion 13 and a bell-shaped end wall portion 14 formed integrally therewith and jointly forming a space 15 subject to high pressure, high temperature steam. The end wall portion 14 is provided with a central circular opening 16 through which the shaft 12 freely extends with considerable annular clearance.

The end wall 14 is further provided with an annular portion 17 usually termed a gland ring. The gland ring 17 is of considerably greater thickness than the remainder of the wall in order to accommodate two axially spaced seal ring structures 19 and 20. The seal ring structures 19 and 20 may be substantially similar to each other and of any suitable type. In this instance, the seal ring 19 carries three rows of circular seals 21 disposed in encompassing and closely spaced relation with the shaft 12, and the seal ring 20 is provided with three rows of circular seals 22 disposed in encompassing and closely spaced relation with the shaft. As illustrated, the seal rings 19 and 20 are provided with annular ribs 25 and 26, received in annular recesses 27 and 28, respectively, provided in the gland ring 17.

The seal rings 19 and 20, together with the gland ring 17, jointly define an annular chamber 29, and an aperture 30 communicating with the chamber 29 is provided in the gland ring 17.

The seal rings 19 and 20, together with the gland ring 17, jointly define an annular chamber 29, and an aperture 30 communicating with the chamber 29 is provided in the gland ring 17.

In operation, as well known, the space 15 enclosed by the casing 10 is subject to high temperature, high pressure steam, and the shaft 12 rotates about the axis 11. A portion of this steam flows along the shaft 12 and past the seals 21 and 22, since the seals restrict but do not absolutely prevent leakage of steam therepast. To minimize leakage of highly pressurized steam past the seals 22 to the region externally of the casing 10, the aperture 30 is connected by any suitable means such as a conduit (not shown) to a region of lower pressure than that prevailing in the casing space 15. For example, in one application, the internal steam pressure employed in the space 15 is 700 p.s.i.a. and the chamber 29 is maintained at a pressure of 150 p.s.i.a., so that the pressure drop across the seal ring 19 is 550 p.s.i.a. while the pressure drop across the seal ring 20 to atmosphere is 136 p.s.i.a.

Although the above described prior art structure is highly adequate and reliable, it has been found that the internal pressure loading forces on the end wall portion 14 are so distributed that the summation of the moments of force acting thereon as indicated by the arrows A and B, are considerable, thereby requiring the end wall to be formed with considerable thickness of metal to safely withstand these moments.

Also, the axial thickness of the gland ring 17 is greater than required for load carrying capability, since the space 29 must be provided with sufficient axial width to permit communication with the aperture 30.

Figure 2:
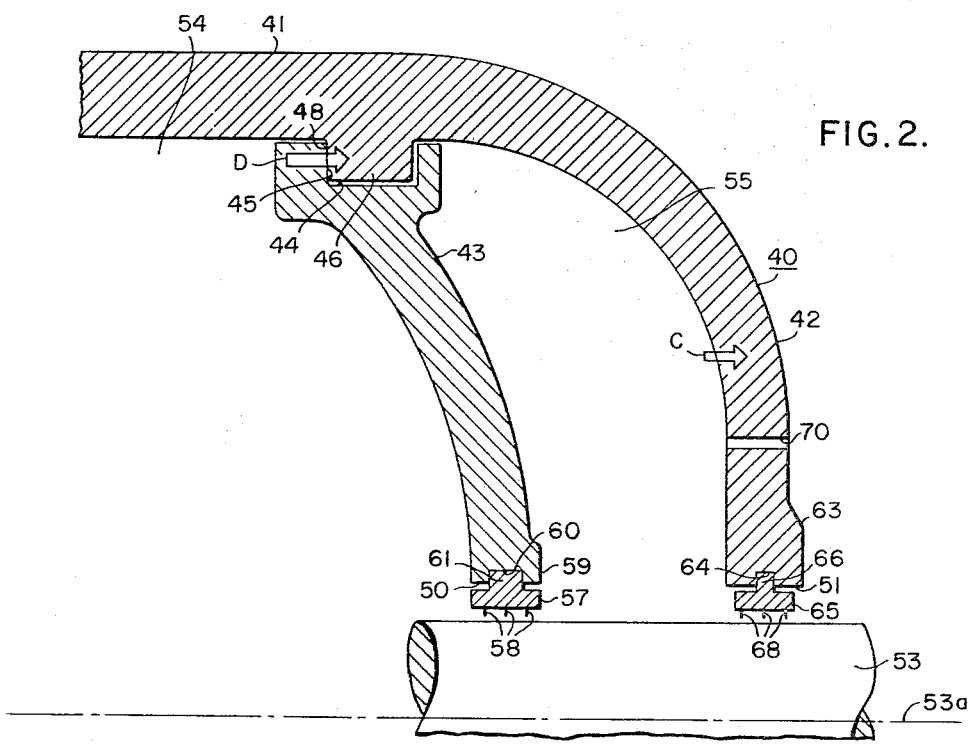
FIG. 2 is a diagrammatic fragmentary sectional view of a turbine casing formed in accordance with the invention.

In accordance with the invention, as illustrated in fragmentary radial section in FIG. 2, there is provided a steam turbine casing structure 40 having a tubular wall portion 41 and a bell-shaped end wall portion 42 formed integrally therewith. Within the tubular wall 41 there is provided an annular internal wall member or partition 43, suitably keyed to the tubular wall portion in a substantially fluid pressure tight manner. In the example shown, the partition 43 has a peripheral groove 44 partly defined by a peripheral surface portion 45 and the tubular wall 41 is provided with an inwardly extending annular projection 46 received in the groove 44 and having an annular surface portion 48 disposed in sealing abutment with the surface 45.

The partition 43 and the end wall 42 are provided with axially aligned circular openings 50 and 51, respectively, through which a rotor shaft 53 having a central axis 53a extends with circumferential clearance.

The tubular wall 41 and the partition 43 jointly define a space 54 subject to high temperature, high pressure steam, while the partition 43 and the external end wall 42 jointly define a chamber 55 subject to steam pressure caused by leakage from the space 54 past the opening 50. To restrict flow of steam through the opening 50 to the chamber 55, there is provided a seal ring structure 57 carrying a plurality of circular seals 58 disposed in encompassing and closely spaced relation with the shaft 53. The partition 43 is provided with a central gland ring portion 59 having an annular recess 60 and the seal ring 57 is provided with an annular rib 61 received in the recess 60, to restrict flow of steam from the chamber 55 to the region external of the casing, the end wall 42 is provided with a gland ring 63 having an annular recess 64 encompassing the opening 51 and a seal ring structure 65 having an annular rib 66 received in the recess 64 is provided with a plurality of circular seals 68 disposed in encompassing and closely spaced relation with the shaft 53. As well known in the art, the seals 58 and 68 may be arcuate segments disposed in annular arrays.

The chamber 55 is maintained at a lower pressure than the space 54 by providing a bleed aperture 70 in the end wall 42 and connecting the aperture to a suitable region of lower pressure by a suitable conduit (not shown).

Since the seal structures 57 and 65 are carried by the separate gland rings 59 and 63, respectively, and since the gland rings are provided on separate wall members (43 and 42), the gland rings do not determine the axial spacing of the chamber 55 and may be designed to optimum size and proportions to accommodate the summation of the moments of force thereon by the steam pressure loading transmitted thereto by the seal rings. Also, the location of the bleed aperture 70 may be optimally selected at any desired point in the end wall 42.

The end wall 42 with the above arrangement is subject to a lower pressure loading, and hence to smaller moments, as indicated by the arrow C, than the prior art (FIG. 1), assuming the same steam pressure conditions, since the pressure in the chamber 55 is maintained at a considerably lower value than in the space 54 and the pressure loading due to the pressure in the space 54 is assumed by the partition 43 and exerted against the wall portion 41, as indicated by the arrow D. Accordingly, the end wall 42 may be formed with a relatively thinner cross-sectional thickness than with the prior art arrangement.

In FIG. 3, there is shown a steam turbine casing structure 71 illustrating another embodiment of the invention. In this embodiment the external casing 72 is also provided with a tubular wall portion 73 and a bell-shaped end wall portion 74, and the end wall is provided with a gland ring 75 carrying a seal ring structure 76 encompassing a turbine shaft 77 that is rotatable about its longitudinal axis 77a.

In this embodiment, however, there is provided an internal annular partition 78 of smaller radius $R_1$ than the internal radius $R_2$ of the tubular wall portion 73 and having an annular peripheral portion 79 disposed in sealing abutment with the end wall 74 of the casing.

The partition 78 is provided with a gland ring 80 carrying a seal ring structure 81 encompassing the shaft 77 and effective to restrict flow of high pressure steam from the space 82, defined by the wall portions 73 and 74 and the partition 78, into the annular chamber 83, defined by the partition 78 and that portion of the external end wall 74 disposed radially inwardly of the peripheral sealing portion 79.

The end wall 74 is provided with an aperture 85 communicating with the chamber 83 and connectable by a suitable conduit (not shown) to a region of lower pressure, as known in the art. Accordingly, the pressure within the chamber 83 caused by steam leaking thereinto past the seal ring structure 81 is maintained at a lower pressure than in the space 82, and the end wall 74 is subject to lower steam pressure loads, indicated by the arrows E, F and G, than in the prior art structure 10 shown in FIG. 1. Since the partition 78 is of smaller relative radius than that of the partition 43 shown in FIG. 2, the end wall 74 is subject to somewhat larger pressure loads than the end wall 42 in FIG. 2. It will be noted that the pressure loading indicated by the arrow E is attained by the steam pressure in the space 82, that indicated by the arrow F is attained by the difference in pressures between the space 82 and the chamber 83, while that indicated by the arrow G is attained by the pressure in the chamber 83. However, it will now be apparent that the radius $R_1$ of the partition 78 may be modified as desired and as dictated by specific design criteria, without comprising the provision of the bleed aperture 85 and/or the dimensions of the outer gland ring 75.

For consistency of description, the seal structures 81 and 76 have been illustrated as including three annular seal members 87 and 88, respectively.

FIGS. 4, 5 and 6 are views showing in more structural detail, the embodiment described above and illustrated in FIG. 3. Accordingly, the same reference numerals are employed therein.

As illustrated in these figures, the structure 71 is divided into similar upper and lower halves, i.e., the casing 72 is preferably divided in a horizontal plane P into substantially similar upper and lower halves 72a and 72b. Similarly, the internal partition 78 is divided into similar upper and lower halves 78a and 78b, and the external gland ring 75 may be formed separately and divided into similar upper and lower halves 75a and 75b. Also, the seal rings 87 and 88 may be divided into arcuate segments for ease of assembly, and the gland rings 80 and 75 are axially elongated to permit spacing of their seals 87 and 88.

The upper and lower casing halves may be joined together by suitable bolts (not shown) as well known.

The upper partition structure 78a together with its seal ring structure 87 is connected to the upper half 72a by a plurality of radially outwardly extending angularly spaced lugs 89 disposed in keyed or locking relation with an equal plurality of radially inwardly extending lugs 90 provided in the casing half 72a. Between adjacent pairs of lugs 89, 90 there are provided arcuate openings 91 providing fluid communication between the chamber 83 and the steam leakage path past the seal rings 87, so that leakage steam past the seal rings 87 is free to flow into the chamber 83. If desired, the upper partition 78a may be locked against rotation with respect to the casing half 72a by a suitable dowel pin 92.

The lower partition half 78b is identical to the upper partition half 78a and is attached to the lower casing half 72b in a similar manner.

The external gland halves 75a and 75b are attached to their respective casing halves 72a, 72b by an annular array of suitable bolts 93 (only one shown).

The moments of force exerted on the embodiment shown in FIGS. 4, 5 and 6 due to the steam pressure loading are substantially the same as those described in the diagrammatic view shown in FIG. 3.

Although several embodiments have been shown and described, it will be understood that the invention is not limited thereto and that many modifications thereof may be made without departing from the spirit and scope of the invention.

What is claimed is:

1. An elastic fluid turbine casing structure comprising a generally tubular external wall portion and an external end wall portion, said tubular wall portion and said end wall portion jointly defining, in part, a space subject to elastic fluid pressure, said end wall portion having a first opening through which a rotatable shaft is adapted to extend, first sealing means disposed in said opening, an internal end wall member disposed in said space and having a peripheral marginal portion in sealing abutment with one of said wall portions, said internal end wall and said external end wall portion jointly defining an annular chamber, said internal end wall having a second opening in registry with said first circular opening through which said shaft is adapted to extend, second sealing means in said second opening for minimizing flow of pressurized elastic fluid from said space to said chamber, said first sealing means being effective to minimize flow of pressurized fluid from said chamber, and means for connecting said chamber to a region of lower pressure than said space, whereby the fluid pressure level in said chamber is maintained at a lower value than in said space.

2. An elastic fluid turbine casing structure comprising a substantially tubular external wall portion and an external end wall portion, said wall portions being integral with each other and jointly defining, in part, a space subject to elastic fluid pressure, an internal end wall member disposed in said space and having a peripheral marginal portion in annular sealing abutment with said end wall portion, whereby said internal end wall member and said external end wall portion jointly define an annular chamber, said internal end wall member and said external end wall member having mutually aligned openings through which a rotatable shaft extends, first sealing means disposed in the opening in said internal wall for restricting flow of pressurized fluid from said space to said chamber, second sealing means disposed in the opening in said external end wall for restricting flow of pressurized fluid from said chamber to the exterior of said casing, and means for connecting said chamber to a region of lower pressure than said space, whereby the pressure of fluid in said chamber due to leakage past said first sealing means is maintained at a level lower than in said space, said internal end wall being of smaller diametric extent than said external end wall.

3. The structure recited in claim 2 in which the connecting means comprises an aperture extending through the external end wall and communicating with the chamber.

4. The structure recited in claim 1 in which the internal end wall member is of annular shape and has an annular portion elongated in a direction parallel to the axis of the opening, and the sealing means includes an annular array of arcuate seal members carried by said elongated portion of the internal end wall member.

5. In an elastic fluid turbine, a casing structure comprising a substantially tubular external wall portion and an external end wall portion integral with each other and jointly defining, in part, a space subject to elastic fluid pressure, an internal end wall member disposed in said space and having a peripheral margin portion in annular sealing abutment with one of said wall portions and jointly therewith defining an annular chamber, said internal and external end wall members having mutually aligned openings, a rotatable shaft extending through said aligned openings, first sealing means carried by said internal wall for restricting flow of pressurized fluid past said shaft from said space to said chamber, second sealing means carried by said external end wall for restricting flow of pressurized fluid past said shaft from said chamber to the exterior of said casing, and means for connecting said chamber to a region of lower pressure than said space, whereby the pressure of fluid in said chamber due to leakage past said first sealing means is maintained at a value lower than in said space.

6. The structure recited in claim 5 in which the internal end wall is of smaller diametric extent than the external end wall, and the connecting means includes an aperture provided in the external end wall and communicating with the chamber.

References Cited by the Examiner

UNITED STATES PATENTS

| 1,037,647 | 9/1912 | London | 253—39 |
| 1,555,726 | 9/1925 | Wechsberg | 277—71 |
| 2,584,513 | 2/1952 | Summers | 277—70 |
| 2,891,808 | 6/1959 | Richardson | 277—53 |

FOREIGN PATENTS

| 5,216 | 9/1901 | Austria. |
| 1,301,856 | 7/1962 | France. |
| 395,626 | 7/1933 | Great Britain. |
| 54,067 | 6/1934 | Norway. |

MARTIN P. SCHWADRON, *Primary Examiner.*

E. A. POWELL, JR., *Assistant Examiner.*